March 11, 1924.
A. A. DIETER
MANUALLY OPERABLE CRANK
Filed April 19, 1923
1,486,366
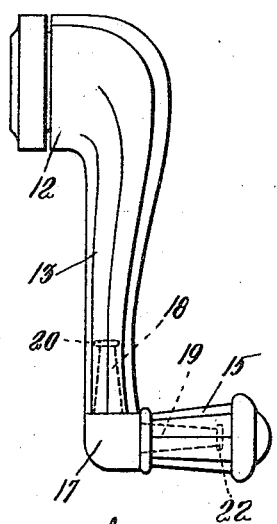
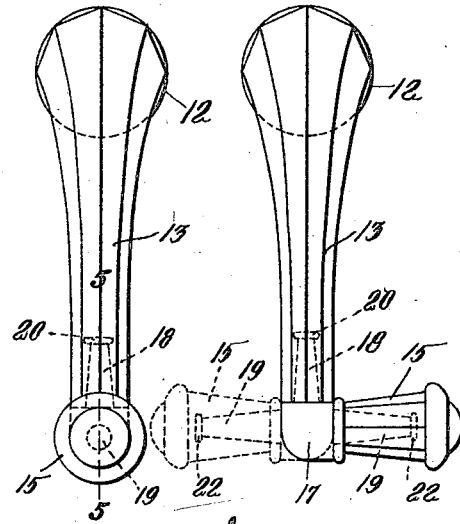
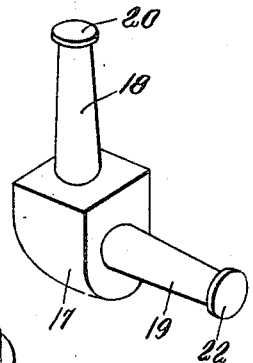
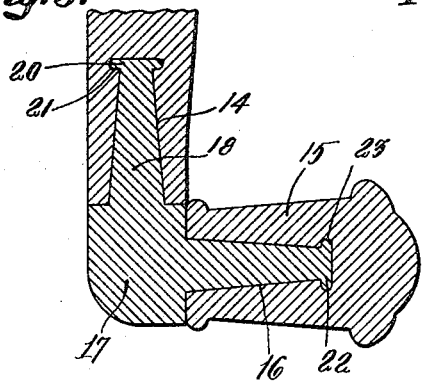
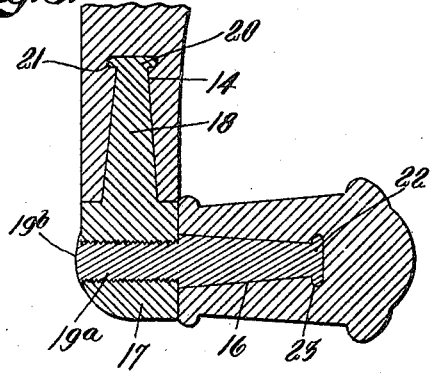
Inventor
Alvin A. Dieter
by Wright, Brown, Quinby & May
Attys.

Patented Mar. 11, 1924.

1,486,366

UNITED STATES PATENT OFFICE.

ALVIN A. DIETER, OF MELROSE, MASSACHUSETTS.

MANUALLY-OPERABLE CRANK.

Application filed April 19, 1923. Serial No. 633,283.

*To all whom it may concern:*

Be it known that I, ALVIN A. DIETER, a citizen of the United States, residing at Melrose, in the county of Middlesex and State of Massachusetts, have invented new and useful Improvements in Manually-Operable Cranks, of which the following is a specification.

This invention relates chiefly to a crank forming a part of the mechanism for operating a sliding window sash in the door of a closed motor car body, such as a sedan or limousine, the crank comprising a hub portion secured to another part of the operating mechanism, an arm standing substantially at right angles with the axis of the hub in close proximity to the inner side of the door, and a handle to be grasped by the operator.

When the crank is being revolved to operate the sash, the handle should project from the arm and substantially at right angles therewith, into the space enclosed by the vehicle body. It is desirable, however, to movably connect the handle with the arm in such manner that when the crank is not in use, the handle may be adjusted to a non-interfering position, in which the handle is free from liability to interfere with the bodies and the clothing of occupants of the vehicle.

The object of the invention is to provide improved means for movably connecting the handle with the arm in such manner that the handle may be readily adjusted to its operative position, and to an inoperative or non-interfering position.

I attain this object by the improved construction hereinafter described and claimed.

Of the accompanying drawings forming a part of this specification,—

Figure 1 is a side view of a crank embodying the invention, the handle being in its operative position.

Figure 2 is a front view of the same.

Figure 3 is a view similar to Figure 2, showing the handle turned to a non-interfering position.

Figure 4 is a perspective view of the portion of the crank hereinafter called the elbow.

Figure 5 is a section on line 5—5 of Figure 2.

Figure 6 is a view similar to Figure 5, showing a modification.

The same reference characters indicate the same parts in all of the figures.

In the drawings, 12 represents the hub portion of a crank which, in this instance, is adapted for use in operating a sliding sash. 13 represents the crank arm which is provided in its outer or free end with a longitudinal socket 14. 15 represents the handle which is usually called the knob in a crank of this character. The handle is provided in its inner end portion with a longitudinal socket 16.

The arm and handle are connected by an elbow which includes a body portion 17, a spindle 18, projecting from the body portion into the arm socket 14, and a wrist-pin 19, projecting from the body portion into the handle socket 16, the spindle and wrist-pin being substantially at right angles with each other, so that the handle stands substantially at right angles with the arm.

The spindle 18 is provided with an enlargement 20, engaged with a groove 21 in the arm socket 14, to confine the elbow in engagement with the arm, the spindle and its enlargement being adapted to turn freely in the arm.

The wrist-pin 19 is provided with an enlargement 22, engaged with a groove 23 in the handle socket 16, to confine the handle in engagement with the elbow, the handle being adapted to turn freely on the wrist-pin and its enlargement.

It will now be seen that the elbow may be turned to cause the handle to project operatively outward from the arm as shown by Figures 1, 2 and 3, so that the operator may revolve the crank by grasping and progressively moving the handle, the wrist-pin 19 turning in the handle while the latter is controlled by the operator.

It will also be seen that when the use of the crank is not required, the elbow may be turned to locate the handle in a non-interfering position, extending substantially at right angles with the axis of the crank, and projecting either to the right as indicated by full lines, or to the left as indicated by dotted lines in Figure 3.

In practice I prefer to die cast the arm 14 on the spindle 18, and the handle 15 on the wrist-pin 19, it being feasible to so cast the arm and handle that when they are solidified, they will turn freely on the spindle and the wrist-pin, any metal usually formed by die-casting being employed as the material of the arm and handle.

The elbow may be formed from any suitable metal before the die-casting operation, and may be made in a single piece, as shown by Figure 5, or the wrist-pin 19 may be formed separately, and provided with a threaded shank 19ᵃ, screwed into a tapped orifice in the elbow body 17, and upset at one end to form a head 19ᵇ.

The spindle 18 and wrist-pin 19 form the sockets 14 and 16 during the die-casting operation.

It is obvious that a crank embodying the invention herein described and claimed may be used for other purposes.

I claim:

A crank comprising an arm having a socket in its outer end; a handle having a socket in its inner end; and an elbow including a body portion, a spindle projecting into and adapted to turn in the arm socket, and having an enlargement engaged with a groove in said socket to confine the elbow in engagement with the arm, and a wrist-pin projecting into the handle socket and having an enlargement engaged with a groove in the handle socket to confine the handle in engagement with the elbow, the handle being supported by the elbow substantially at right angles with the arm, and adapted to rotate on the wrist-pin, the elbow being movable to support the handle in an operative position, projecting outward from the arm, and in a non-interfering position projecting laterally in either direction from the arm.

In testimony whereof I have affixed my signature.

ALVIN A. DIETER.